Sept. 7, 1943.                R. F. SHOUP                2,329,005
                            VOTING MACHINE
            Original Filed March 7, 1939      4 Sheets-Sheet 1

INVENTOR
Ransom F. Shoup
Kenyon & Kenyon
ATTORNEYS

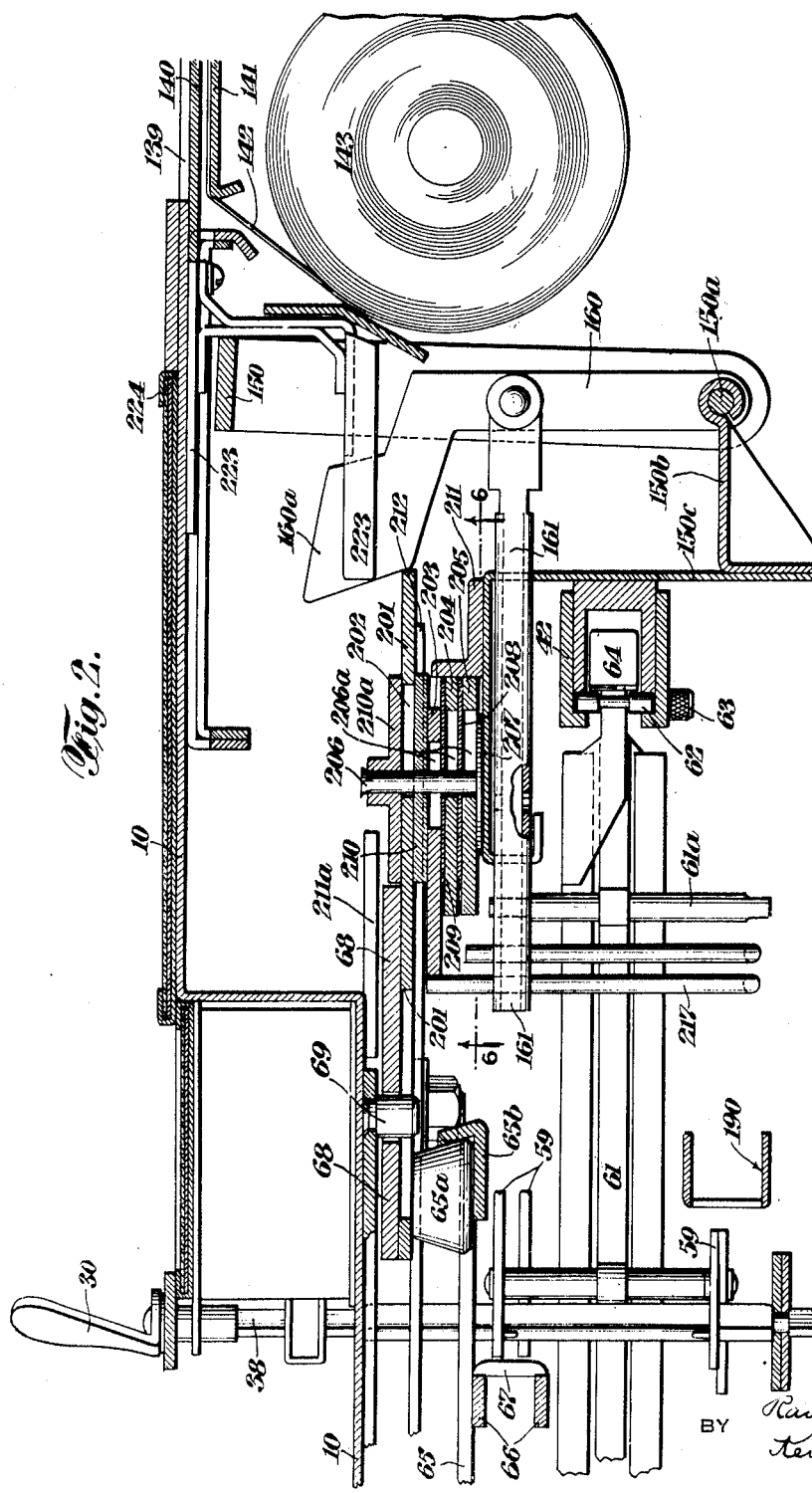

Sept. 7, 1943.    R. F. SHOUP    2,329,005
VOTING MACHINE
Original Filed March 7, 1939    4 Sheets-Sheet 3
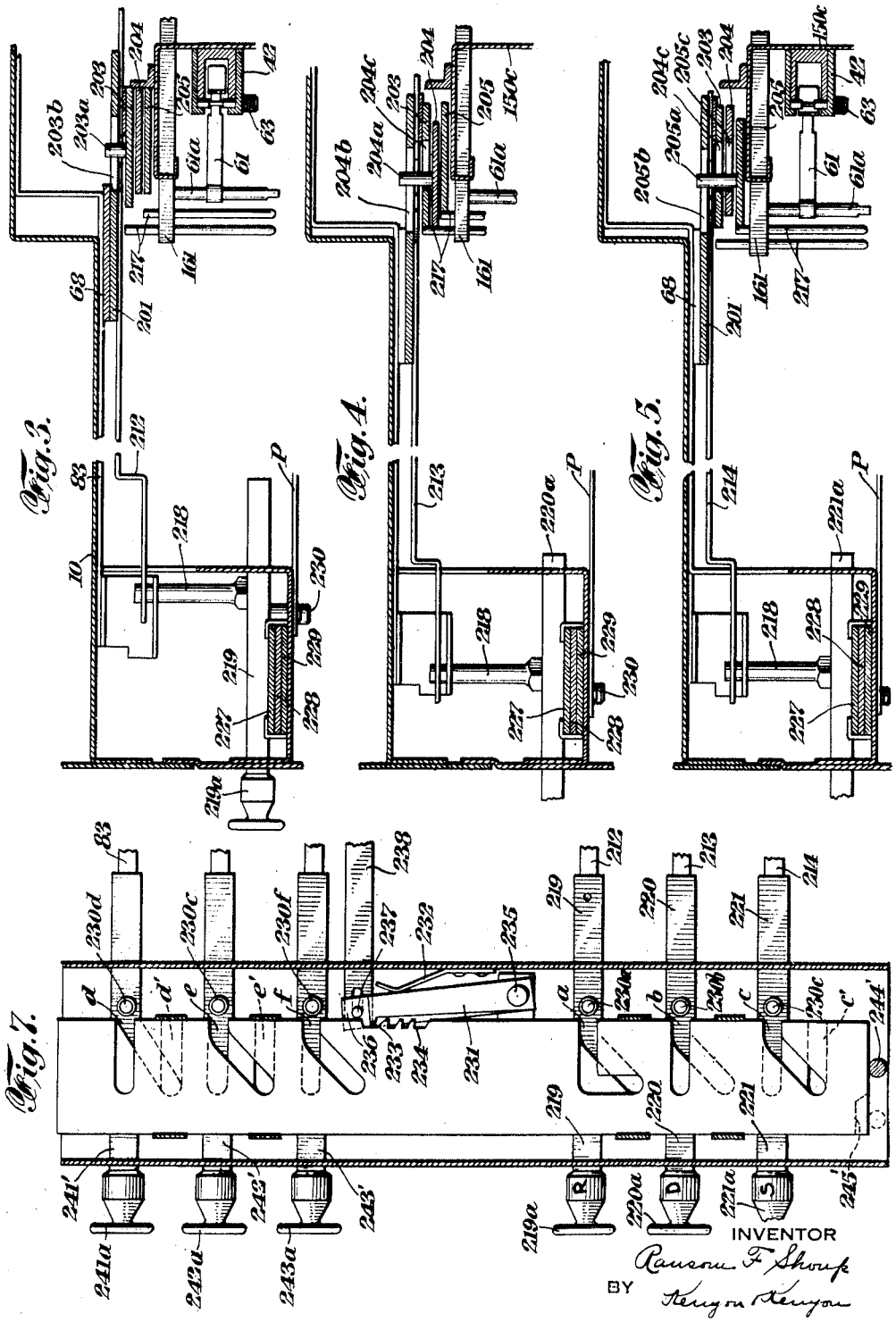

Sept. 7, 1943.  R. F. SHOUP  2,329,005
VOTING MACHINE
Original Filed March 7, 1939   4 Sheets-Sheet 4
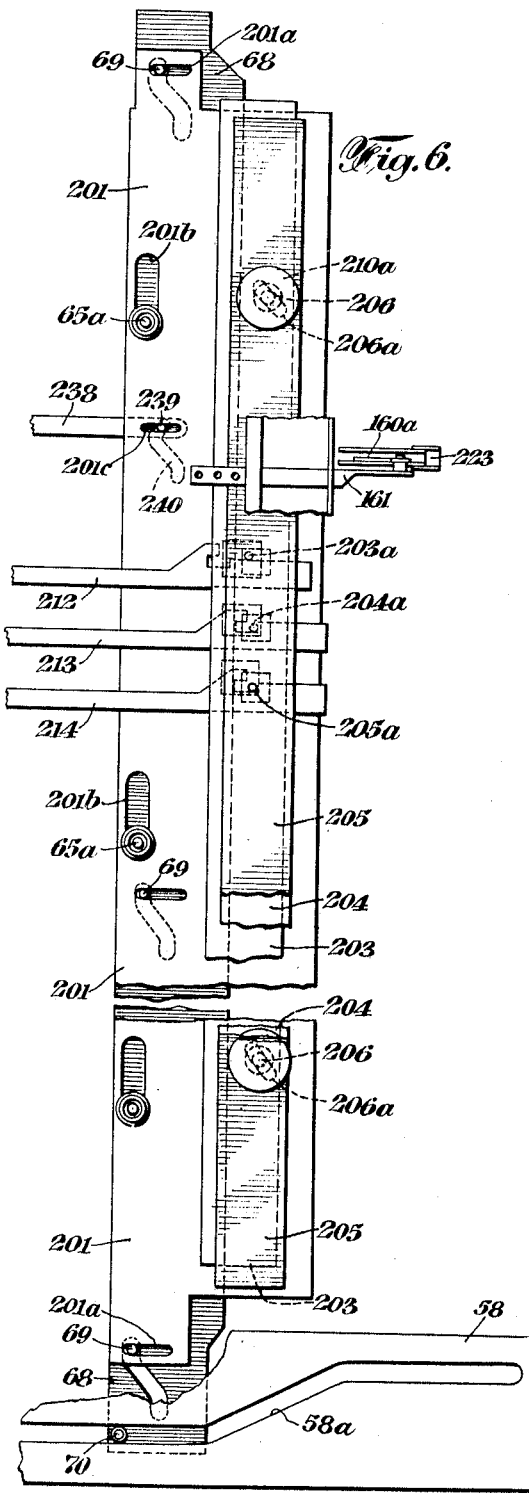
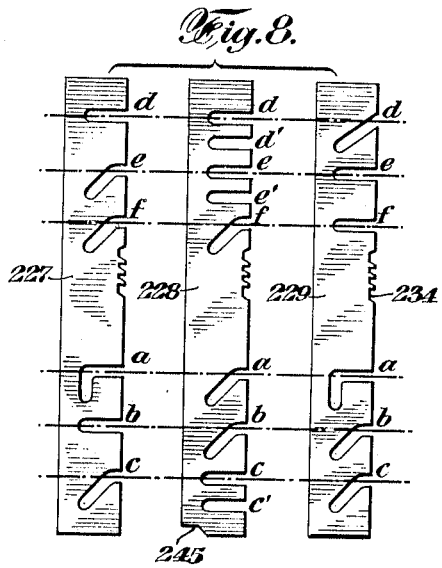
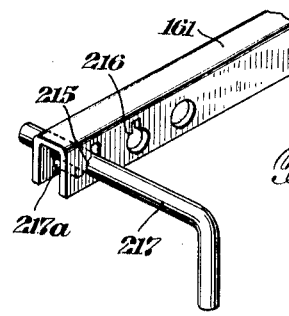
INVENTOR
Ransom F. Shoup
BY Kenyon & Kenyon
ATTORNEYS

UNITED STATES PATENT OFFICE 2,329,005

VOTING MACHINE

Ransom F. Shoup, Ardmore, Pa., assignor to The Shoup Voting Machine Corporation, Philadelphia, Pa., a corporation of Delaware Original application March 7, 1939, Serial No. 260,288. Divided and this application June 4, 1941, Serial No. 396,513

10 Claims. (Cl. 235—51)

This invention relates to voting machines and more especially to voting machines of the type disclosed in Shoup, et al. Patent No. 2,054,102.

Voting machines of this type are equipped with mechanism for conditioning them for primary voting as disclosed in Ransom F. Shoup Patent No. 2,191,086 of Feb. 20, 1940 and with mechanism for conditioning them for the election of delegates to the National Convention of the various parties as disclosed in Ransom F. Shoup Patent No. 2,251,254 of July 29, 1941. The operation of the primary mechanism and the delegate mechanism is controlled by a plurality of draw bars having knobs exterior of the machine for actuation by the election officer.

An object of this invention is an interlock for the above-mentioned draw bars to control their operation according to the type of voting for which the machine is conditioned and to render said draw bars inoperative when the machine is conditioned for general voting.

Other objects, novel features and advantages of this invention will become apparent from the following specification and accompanying drawings, wherein:

Fig. 2 is a fragmentary enlarged section on the line 2—2 of Fig. 1 in curtain-open position and with the spindle control mechanism of one political party in actuated position;

Fig. 3 is an enlarged section on the line 3—3 of Fig. 1 in curtain-open position with the spindle control mechanism of all parties unactuated;

Fig. 4 is an enlarged fragmentary section on the line 4—4 of Fig. 1 in curtain-closed condition with the spindle control mechanism of a second party in actuated condition;

Fig. 5 is an enlarged fragmentary section on the line 5—5 of Fig. 1 in curtain-closed condition with the spindle control mechanism of a third party in actuated position;

Fig. 6 is a section substantially on the line 6—6 of Fig. 2;

Fig. 7 is an elevation of the interlock mechanism;

Fig. 8 is an elevation of the interlock plates in offset relation, and

Fig. 9 is a perspective view of a part of the delegate mechanism.

Figure 1:
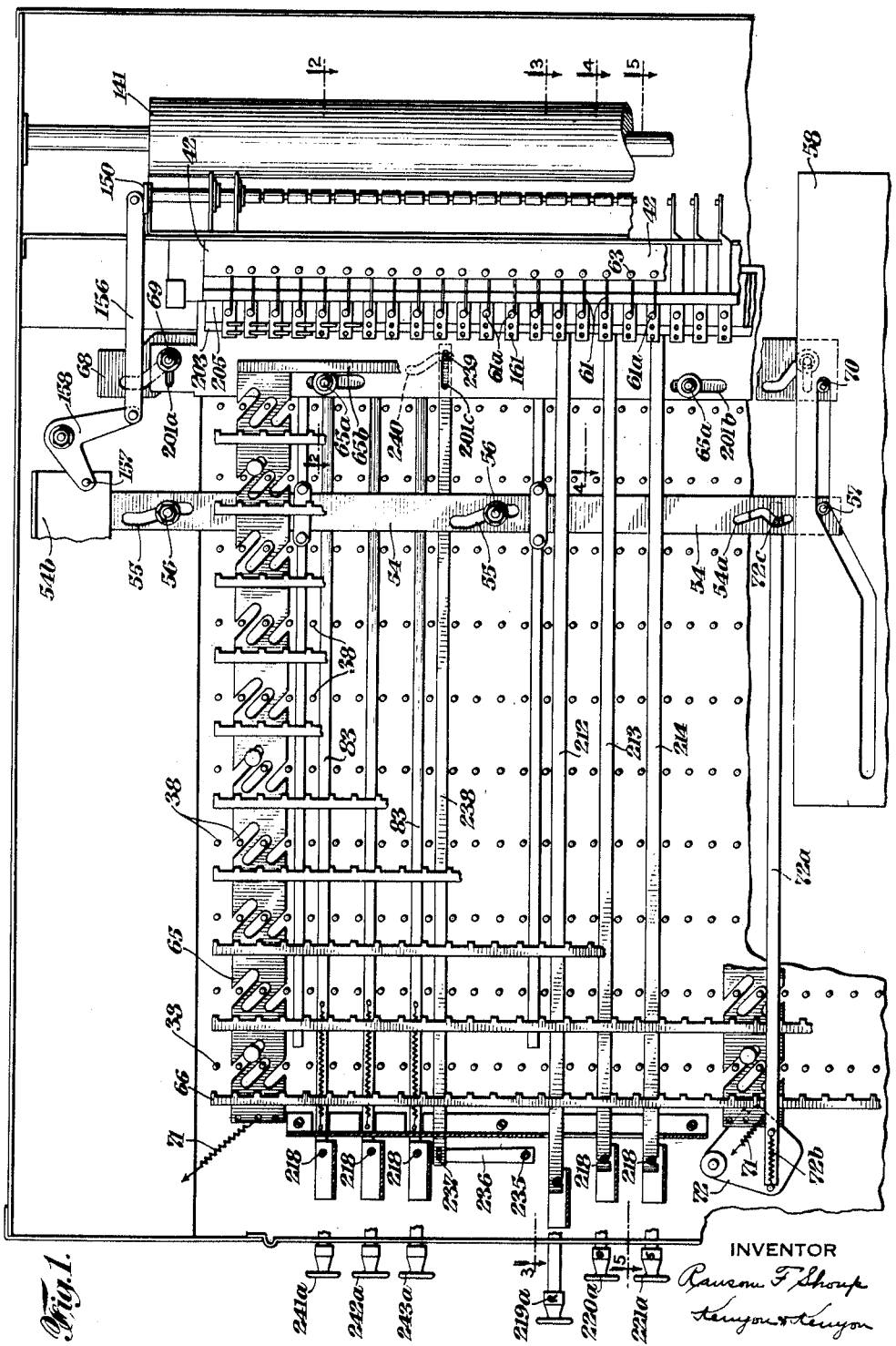
Fig. 1 is a rear view of a voting machine embodying the invention, only such parts of the machine being shown as are pertinent to the invention and in curtain-closed position.

In this paragraph is described structure common both to voting machines embodying the present invention and to the machine of Shoup, et al. Patent No. 2,054,102 and corresponding parts are designated by the same reference characters in so far as is practical. In Fig. 1 is disclosed a casing 10 enclosing a spindle locking and restoring frame consisting of horizontal bars 65 connected by vertical channel bars 66 having cut-out portions providing rungs 67 arranged to engage arms 59 carried by the voting spindles 38 having handles 30. The bars 65 are provided with oblique slots in which voting spindles are received and also with an interconnecting track member 65b which engages rollers 65a carried by a vertical bar 68. The bar 68 is provided with oblique slots through which extend pins 69 carried by the casing. At the lower end of the bar 68 is provided a stud 70 which extends into the slot 58a in the main cam bar 58. The arrangement is such that upon leftward movement of the main cam bar 58 from its curtain-open position (Fig. 6) to its curtain-closed position, Fig. 1, the bar 68 is elevated and moved to the left from the position shown in Fig. 6 to the position shown in Fig. 1 and upon return movement of the main cam bar to its curtain open position (Fig. 6) the bar 68 returns to the position shown in Fig. 6. A vertical bar 54 has oblique slots 55 through which extend pins 56 supported by the casing and carries a pin 57 projecting into the slot 58a so that upon movement of the main cam bar from its curtain open position, Fig. 6, to its curtain-closed position, Fig. 1, the bar 54 is lifted and moved horizontally from its normal position (not shown) into the position shown in Fig. 1 to release the counters (not shown) by mechanism (not shown) and upon return of the main cam bar to curtain-open position, the bar 54 returns to its original position to lock the counters. Springs 71 tend to pull the spindle locking and restoring frame leftward and upward and a latch 72 is provided for holding such frame in spindle locking position when the machine is in curtain-open condition. A link 72a is connected at one end to said latch 72 through a spring 72b and at its other end has a stud 72c fitting into a slot 54a in the bar 54. The link is actuated to release the frame just before the bar 54 reaches curtain-closed position. The voting handle or spindle interlock comprises horizontal straps 61 (Fig. 2) connected to arms 59 on the spindle 38 and passing in groups between pairs of rollers 62 supported in longitudinal grooves in the inner faces of a vertical channel member 42. Certain of the rollers 62 are tubular and headed pins 63 extend through them and passages in the channel member to lock said enlarged head or wedge 64. In the front wall of the casing 10 is provided a vertical column of personal choice slots 139 with a slidable closure 140 for each slot. In back of the slots is a guide 141 over which passes a sheet of paper 142 from a feed roller 143 to a take-up roller (not shown), Fig. 2. A yoke 150 pivotally supported on a rod 150a is actuated counter-clockwise from the position shown in Fig. 2 by movement of any closure 140 to open position, through the medium of a slide 223 subsequently to be described and, if actuated, is returned to its original position upon return of the machine to curtain-open position through the engagement of the flange 54b at the upper end of the bar 54 with the pin 157 carried by one arm of a bell crank lever 158, the other arm of which is connected through the link 156 with the yoke 150. The yoke 150 coacts with mechanism, not shown, to advance the strip 142 a predetermined distance for each actuation of the yoke. A vertical plate 150c of the shape shown in Figs. 2 and 3 is provided with a vertical series of apertures constituting guideways for links or draw bars 161 which, at one end, are attached to arms 160 pivotally supported by the rod 150a mounted in brackets 150b attached to the plate 150c, and each link 161 is provided with a pin 61a connected to an interlock strap 61. Means actuated by each personal choice slot closure engages each corresponding arm 160 to move the latter leftward upon opening of the slot, thereby actuating a corresponding strap 61 of the spindle interlock. Means, later to be described, and equivalent to the means shown in said Patent No. 2,054,102 are provided for returning any actuated arm to the position shown in Fig. 2 upon return of the machine to curtain-open position. The operation of the above-described mechanism is the same as in said Shoup, et al. patent and will not be herein set forth in detail.

A plate-like carrier 201 (Figs. 2 and 6) engages the rear face of the bar 68 and is provided with horizontal slots 201a through which extend the pins 69 fixed to the casing and also with horizontal slots 202. The carrier 201 is also provided with vertical slots 201b through which extend pins carried by the bar 68 and supporting the rollers 65a. The carrier 201 is limited to horizontal movement by the pins 69 and moves leftward from the position shown in Fig. 6 upon upward and leftward movement of the bar 68. Three vertical plates 203, 204 and 205 have corresponding oblique slots 206a extending downwardly from left to right through which extend pins 206 also extending through the slots 202 in the carrier 201. The pins 206 are provided with heads 207 engaging the outer surface of the plate 205 and carry washers 208, 209, 210 and 210a, the latter of which have hubs over which the ends of the pins 206 are spread to prevent withdrawal of the pins (Fig. 2). The upper ends of the oblique slots previously referred to normally contact the pins 206 to support the plates from the carrier. The slots 202 are of less length than the extent of horizontal movement of the bar 68 to which the carrier 201 is attached, such extent of movement being determined by operating requirements of other parts of the voting machine than those to which this invention is directed. Therefore, a lost motion connection exists between the pins 206 and the carrier 201 so that upon horizontal reciprocation of the carrier the pins 206 are also horizontally reciprocated, but over a shorter path. In curtain-open position, the pins 206 contact the left ends of the slots 202 and in curtain-closed position these pins contact the right ends of said slots. A stop 211 is provided on the plate 150c for engagement by the right edges of the plates 203, 204 and 205 and a stop 211a is carried by the casing 10 for engagement by the hub of each washer 210a to limit leftward movement of the pins 206 from the position shown in Fig. 2. The plates 204 and 205 are of the same width while the plate 203 is slightly wider than the other two plates and are staggered with respect to the plate 203 in such relation that at no time does the left edge of either of the plates 204 and 205 extend beyond the left edge of the plate 203.

The carrier 201 is provided with three square apertures 203b, 204b and 205b arranged at different elevations (Figs. 3, 4 and 5). The plate 203 is provided with two square apertures 204c and 205c equal to and in alinement with the apertures 204b and 205b respectively. The plate 204 is provided with an aperture 205d equal to and in alinement with the apertures 205b and 205c. A pin 203a is carried by the plate 203 and projects through the aperture 203b. A pin 204a is carried by the plate 204 and projects through the apertures 204c and 204b. The plate 205 is provided with a pin 205a which projects through the apertures 205d, 205c and 205b. Each of the apertures is of sufficient area to permit upward and leftward movement of any plate along the path defined by the pins 206 and the slots 206a through which they project without contact of any pins 203a, 204a or 205a with the top or left wall of any aperture.

Horizontal pull rods 212, 213 and 214 (Figs. 2 and 6) arranged at different elevations pass between the plate 203 and the carrier 201 and each rod at its right end is slidably supported by a bracket on the carrier 201 and is provided with a horizontal slot, on the bottom of which normally rests one of the pins 203a, 204a and 205a, each slot having an upwardly directed opening at its right end to permit upward movement of the pin out of the slot (Fig. 6). Each rod extends a substantial distance to the right beyond the right end of the slot. Leftward movement of the pull rod 212 with the right end of its slot in contact with the pin 203a causes simultaneous upward movement of the plate 203 through the medium of the pins 206 and resulting movement of the pin 203a upward out of engagement with the rear wall of the slot, thereby freeing the rod for further leftward movement to locate its top edge under the pin 203a to hold the plate 203 in elevated position during the later-to-be-described leftward movement thereof. Leftward movement of either rod 213 or 214 causes corresponding operation of the plates 204 or 205 respectively.

In each link 161 are provided apertures 215 and 216 having upwardly directed keyways. Each link is provided with a pin 61a connected to an interlock strap 61. These apertures are adapted to receive pins 217 having keys 217a which will pass through the keyways and then serve to lock the pins in the link (Fig. 9). The end of each pin 217 is bent into radial alinement with the key 217a so that the pin is held by gravity with the key 217a extending downwardly, thus preventing accidental removal of the pins 217. The pins in the apertures 215 are of sufficient length to extend into the path of the plate 203 while the pins in the apertures 216 are of sufficient length to extend into the path of one or both of the plates 204 and 205 (Figs. 3, 4 and 5). The straps 212, 213 and 214 have connection through pins 218 with bars 219, 220 and 221 respectively which extend through the end wall of the casing and are provided with knobs 219a, 220a and 221a (Figs. 1 and 7). In curtain-open position, the right edge of carrier 201 engages the heads 160a and is effective upon return of the machine to curtain-open position to restore any actuated arm 160 to the position shown in Fig. 2.

The foregoing mechanism provides means for selectively limiting the number of voting spindles which may be operated in connection with the election of party convention delegates and alternates and other similar election situations. The operation of this mechanism is fully described in Ransom F. Shoup Patent No. 2,251,254 of July 29, 1941.

Mechanism including the arms 160, runner 222, slide 223 and other elements, not shown, are provided for preventing the opening of a slide 140 corresponding to a link 161 which has been actuated by one of the delegate plates so as to prevent a voter from registering a personal choice vote in addition to actuating the number of spindles allocated to his party. Such mechanism may be of the structure illustrated and claimed in Ransom F. Shoup Patent No. 2,251,255 of July 29, 1941.

Means are provided for controlling the number of knobs 219a, 220 and 221a that may be actuated at any one time. Such means comprises three equal size plates 227, 228 and 229 which are arranged vertically side by side as shown in Fig. 8. In the particular embodiment herein illustrated, the lower half of each of these plates is provided with slots a, b and c. In the plate 227, the slot a is horizontal with a vertical component leading downwardly from its inner end while the slot b is fully horizontal and the slot c has an oblique component. In the plate 228, the slots a and b have oblique components while the slot c is fully horizontal. In the plate 229, the slot a is the same as the slot a in plate 227 while the slots b and c have oblique components. The extent of offset between the opposite ends of each oblique component is the same as the extent of offset between the opposite ends of each remaining oblique component and is also equal to the extent of each vertical component. The rods 219, 220 and 221 are provided respectively with pins 230a, 230b, and 230c adapted respectively to enter the slots a, b and c of the three plates 227, 228 and 229. Thus, when knob 219a is pulled, pin 230a enters the three slots a of the three plates with the result that the plate 228 is lifted to misaline the slots b and c thereof with the slots b and c of plates 227 and 229. When the knob 220a is pulled, the pin 230b enters the three slots b with the result that the plates 228 and 229 are lifted, thus misalining the slots a and c thereof with the slots a and c of plate 227. When the knob 221a is pulled, the pin 230c enters the three slots c with the result that plates 227 and 229 are lifted, so that the slots a and b thereof are misalined with the slots a and b of plate 228. Which ever plate or plates are thus elevated are held in elevated position by a latch 231 pressed toward the right edges of the bars by a spring 232 (Fig. 7). The arrangement of slots in the plates 227, 228 and 229 is such as to prevent simultaneous operation of any two of the bars 219, 220 and 221, as well as to lock out two of such bars by action of one bar. The latch has a tooth 233 which engages notches 234 in the plates to maintain them in elevated position. The latch 233 is carried by a shaft 235 which is also attached to an arm 236 provided with a pin 237. A link 238 has at one end a slot into which extends a pin 237 and at its other end is provided with a pin 239 extending through a slot 240 in the bar 68 and a horizontal slot 206c in the carrier 201 (Fig. 6), the shape of the slot 240 being such that upon movement of the bar 68 from a curtain-open to curtain-closing position, the link 238 is first positively moved to the left and is then released from the control of the bar 68 to be held by the spring 232 and upon return movement of the bar 68 from curtain-closing to curtain-open position, the link 238 is free of the control of the bar 68 until the latter reaches nearly the end of its return stroke when the link 238 is then moved to the right to pull the latch 231 into inoperative position. The timing of the operation of the latch is such that it is not released until after full return of the locking and restoring frame to spindle-locking position.

The interlock illustrated in Figs. 7 and 8 has other functions than the above-described use in connection with the delegate mechanism. In addition to the slots a, b and c, the plates 227, 228 and 229 are provided with slots d, e and f. In plates 227 and 228, the slots d are horizontal, while in 229, the slot d has an oblique component. In the plate 227, the slot e has an oblique component while in the plates 228 and 229 slots e are horizontal. In the plates 227 and 228, the slots f have oblique components while in the plate 229, the slot f is horizontal. Draw bars 241', 242' and 243' are provided with the pins 230d, 230e and 230f, adapted respectively to enter the slots d, e and f of the three plates 227, 228 and 229 and with knobs 241a, 242a and 243a. By use of the bars 241, 242 and 243, together with the bars 219, 220 and 221, the machine may be conditioned for a primary election with as many as six parties participating. In such event, each of the aforementioned bars is connected to a strap P (Fig. 3) which in turn is connected to one of six primary bars 190 for co-operation with arms 59a and spindles 38, all as illustrated and described in Ransom F. Shoup Patent No. 2,191,086 of Feb. 20, 1940. Also, to each pin 218 of the various bars is connected a strap 83 leading to a marker (not shown) for properly marking the paper 142 with a party indication as described in Shoup Patent No. 2,054,103. In the event that a delegate election is held simultaneously with a primary election, straps P are connected as above described between the bars 219, 220 and 221 and a corresponding number of bars 190.

A slidable stud 244' underlies the bottom edges of the plates 227, 228 and 229 and the plate 228 is cut away at 245'. When the stud 244' is in the position shown in Fig. 7, it holds the plates in such position that the mouths of slots a, b, c, d, e and f in the three plates are respectively in alinement, but when the stud is in the broken line position the plate 228 drops sufficiently to misaline the slots and prevent actuation of any of the knobs. The stud is moved to broken line position when the machine is set up for general voting, thus rendering inoperative the primary and delegate mechanism.

The plate 228 may be provided with slots d', e' and c' which are identical with the slots d, e and c but offset downwardly therefrom. The relationship of the various components of slots d, e and f is the same as for the slots a, b, and c and the extent of offsets of the slots d', e' and c' from the slots $a$, $e$ and $c$ respectively, equals the extent of offset between the opposite ends of each oblique component of a slot. This arrangement of slots in combination with the shape of the slots $a$ in plates 227 and 229, provides means for conditioning the machine to meet the requirements of certain communities.

For example, a county general election may be held in conjunction with a state primary election and a voter may be eligible to vote in the county election only if he has paid certain taxes before election day, but be eligible to vote in the state primary irrespective of whether or not he is eligible to vote in the county general election. To meet this requirement, bars 241', 242' and 221 allocated to the three principal political parties are connected to bars 190 controlling the spindles allocated to state primary voting and the bar 219 is connected to other bars 190 controlling the spindles allocated to the county general election, while the remaining bars have no connection to any other parts of the machine.

Upon the entry into the machine of a voter qualified to vote in both elections, the election officer pulls knob 219, thus releasing the spindles allocated to the county general election and drawing the pin 230$a$ into the slots $a$ with consequent elevation of the plate 228 to bring the slots $d'$, $e'$ and $c'$ into register with the slots $d$, $e$ and $c$ of the plates 227 and 229. He next pulls one of the knobs 241$a$, 242$a$ and 221$a$ to release the spindles allocated to the party with which the voter is affiliated, such action being permitted by reason of the vertical slots at the ends of the horizontal slots $a$. Operation of any one of the said bars is permitted by reason of the alinement of the slots $d'$, $e'$ and $c'$ of 228 with the slots $d$, $e$ and $c$ of 227 and 229. Actuation of any one of the draw bars 241, 242 and 221 results in locking out the other two as previously described. The voter then indicates his vote by operating the proper voting spindles and his vote is registered in the usual manner.

Upon the entry into the machine of a voter not qualified to vote in the county general election, the election officer does not pull the knob 219$a$ thereby leaving locked the spindles allocated to the county general election, but only operates the proper one of the knobs 241$a$, 242$a$ and 221$a$ to release the spindles allocated to the party with which the voter is affiliated. The voter than operates the spindles to indicate his primary vote which is registered in the usual manner. Other uses of the interlock of Figs. 7 and 8 will be apparent to one skilled in the art and will not be described herein in detail. It is merely necessary in adapting the lockout to other uses to properly connect one or more of the bars 219, 220, 221, 241', 242' and 243' to other parts of the machine.

When the interlock plate 228 is provided with the slots $d'$, $e'$ and $c'$, the machine is limited to five parties in a primary election. The bar 219 cannot be then used as a primary bar for to do so would permit the actuation also of any of the bars 241', 242' and 221 as just described. It would, therefore, be possible for the election officer to release the spindles of two parties instead of merely the spindles of a single party.

This application is a division of Ransom F. Shoup Patent No. 2,251,254 of July 29, 1941.

I claim:

1. In a voting machine, an interlock comprising a plurality of equal size alined plates forming a pack and supported for longitudinal movement, one plate having a first and a second set of straight transverse slots and a plurality of transverse slots having oblique components and each of the remaining plates having straight transverse slots and transverse slots with oblique components and transverse slots with longitudinal components, each slot communicating with an edge of its plate and the open ends of the slots in said remaining plates normally being in alignment with the open ends of slots in said first plate and an oblique component slot of the first plate being aligned with a longitudinal component slot of each remaining plate, each group of alined slots containing at least one slot having an oblique component, a plurality of pull bars, and a pin on each pull bar adapted to enter alined slots of all of said plates to effect longitudinal movement of at least one plate, the extent of said longitudinal components together with the space between said first and second sets of straight transverse slots being equal to the extent of offset between the opposite ends of said oblique components, whereby operation of said one plate by insertion of a pin in an oblique slot thereof locates said first set of straight slots out of register with the slots in the remaining plates and locates said second set of straight slots in register with the slots in said remaining plates to permit insertion of pins in said registering slots.

2. In a voting machine according to claim 1, latch means operative to maintain any plate in actuated position, and means for rendering said latch means inoperative.

3. In a voting machine according to claim 1, a movable member for maintaining said plates with the slots of one plate in register with the slots in each remaining plate, said one plate having provision for movement of said plate out of slot registering position upon movement of said member.

4. In a voting machine, an interlock comprising a plurality of equal size alined plates forming a pack and supported for longitudinal movement, one of said plates having a straight transverse slot and additional transverse slots with oblique components, a second plate having a straight transverse slot and a transverse slot with an oblique component and a transverse slot with a longitudinal component, a third plate having a transverse slot with a longitudinal component and additional transverse slots with oblique components, the open ends of the slots of each plate being alined with the open ends of the slots of each remaining plate, and an additional straight transverse slot in said first plate, each slot communicating with an edge of its plate and the open ends of the slots of the second and third plates normally being in alignment with the open ends of slots in said first plate and each group of aligned slots containing at least one slot having an oblique component and an oblique component slot of the first plate being aligned with a longitudinal component slot of each remaining plate, a plurality of pull bars, and a pin on each pull bar adapted to enter alined slots of all said plates to effect longitudinal actuation of at least one plate, the spacing of the two straight transverse slots of said first plate and the extent of each vertical slot component being equal to the extent of offset between the ends of said oblique slot component whereby operation of said one plate by insertion of a pin in an oblique slot thereof locates said first straight transverse slot out of register with the slots in the remaining plates initially in alinement with said straight slot and locates said second straight transverse slot in register with said slots in said remaining plates to permit insertion of a pin in said registering slots.

5. In a voting machine according to claim 4, latch means operative to maintain any plate in actuated position, and means for rendering said latch means inoperative.

6. In a voting machine according to claim 4, a movable member for maintaining said plates with the slots of one plate in register with the slots in each remaining plate, and one plate having provision for movement of said plate out of slot registering position upon movement of said member.

7. In a voting machine, an interlock comprising a plurality of equal size alined plates forming a pack and supported for longitudinal movement with said plates having a like number of alined transverse slots, some of which are straight and others of which have either longitudinal or oblique components, said slots being so arranged in the plates that at least one slot of a set of alined slots is a slot having an oblique component and is of different shape than the remainder and an oblique component slot of the first plate is aligned with a longitudinal component slot of each remaining plate, a plurality of pull bars, and a pin on each pull bar adapted to enter the alined slots in all of said plates to effect longitudinal movement of at least one plate, one plate having an additional straight transverse slot for each of the first mentioned straight transverse slots, the spacing of each additional slot from its companion slot and the extent of each longitudinal component being equal to the extent of offset between the opposite ends of said oblique components whereby operation of said one plate by insertion of a pin in an oblique slot thereof locates said first straight transverse slot out of register with the slots in the remaining plates and locates said second straight transverse slot in register with slots in said remaining plates to permit insertion of a pin in registering slots.

8. In a voting machine according to claim 7, latch means operative to maintain any plate in actuated position, and means for rendering said latch means inoperative.

9. In a voting machine according to claim 7, a valve member for maintaining said plates with slots of one plate in register with slots in each remaining plate, and one plate having provision for movement of said plate out of slot registering position upon movement of said member.

10. In a voting machine according to claim 7, a member movable between two positions and engageable with the ends of said plates in one of its positions to maintain said plates with slots of one plate in register with slots in each remaining plate and one of said plates having an offset engageable with said member upon movement thereof into its other position to misaline the slots of said plate with respect to the slots of the remaining plates.

RANSOM F. SHOUP.

CERTIFICATE OF CORRECTION.

Patent No. 2,329,005.

September 7, 1943.

RANSOM H. SHOUP.

It is hereby certified that error appears in the printed specification of the above numbered patent requiring correction as follows: Page 4, first column, line 51, for "than" read --then--; page 5, second column, line 18, claim 9, for "valve" read --movable--; and that the said Letters Patent should be read with this correction therein that the same may conform to the record of the case in the Patent Office.

Signed and sealed this 26th day of October, A. D. 1943.

Henry Van Arsdale,
Acting Commissioner of Patents.

(Seal)